US010453619B2

United States Patent
Tanimoto et al.

(10) Patent No.: US 10,453,619 B2
(45) Date of Patent: Oct. 22, 2019

(54) ELECTROLYTIC CAPACITOR WITH CONDUCTIVE POLYMER LAYER

(71) Applicant: Panasonic Intellectual Property Management Co., Ltd., Osaka (JP)

(72) Inventors: Shintaro Tanimoto, Osaka (JP); Youichirou Uka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/646,567

(22) Filed: Jul. 11, 2017

(65) Prior Publication Data

US 2017/0309406 A1  Oct. 26, 2017

Related U.S. Application Data

(63) Continuation of application No. PCT/JP2016/000520, filed on Feb. 2, 2016.

(30) Foreign Application Priority Data

Feb. 4, 2015 (JP) ................. 2015-020605

(51) Int. Cl.
*H01G 9/15* (2006.01)
*H01G 9/028* (2006.01)
(Continued)

(52) U.S. Cl.
CPC ............ *H01G 9/15* (2013.01); *H01G 9/028* (2013.01); *H01G 9/0425* (2013.01); *H01G 9/0036* (2013.01)

(58) Field of Classification Search
CPC ........ H01G 9/15; H01G 9/0425; H01G 9/028; H01G 9/0036
See application file for complete search history.

(56) References Cited

U.S. PATENT DOCUMENTS

2008/0316680 A1* 12/2008 Iida ................ H01G 9/025
361/523
2009/0161299 A1* 6/2009 Nemoto ............. H01G 9/0425
361/532
(Continued)

FOREIGN PATENT DOCUMENTS

CN   102522221 A   6/2012
CN   103959414 A   7/2014
(Continued)

OTHER PUBLICATIONS

International Search Report of PCT application No. PCT/JP2016/000520 dated Apr. 26, 2016.
(Continued)

*Primary Examiner* — David M Sinclair
(74) *Attorney, Agent, or Firm* — McDermott Will & Emery LLP

(57) ABSTRACT

An electrolytic capacitor includes: an anode body; a dielectric layer; a first conductive polymer layer; a second conductive polymer layer; and a first intermediate layer. The dielectric layer is formed on the anode body. The first conductive polymer layer covers at least a part of the dielectric layer. The second conductive polymer layer covers at least a part of the first conductive polymer layer. The first intermediate layer is formed between the first conductive polymer layer and the second conductive polymer layer. The first intermediate layer includes both a cationic agent and an anionic agent, and the first intermediate layer has a first region and a second region, the first region facing the first conductive polymer layer, the second region facing the second conductive polymer layer. The first region contains a greater amount of the anionic agent than the second region, and the second region contains a greater amount of the cationic agent than the first region.

11 Claims, 2 Drawing Sheets

(51) Int. Cl.
*H01G 9/00* (2006.01)
*H01G 9/042* (2006.01)

(56) References Cited

U.S. PATENT DOCUMENTS

| | | | |
|---|---|---|---|
| 2010/0079928 A1* | 4/2010 | Harada | H01G 9/0029 |
| | | | 361/523 |
| 2010/0271757 A1* | 10/2010 | Ishikawa | H01G 9/0036 |
| | | | 361/525 |
| 2011/0188173 A1* | 8/2011 | Ota | H01G 9/26 |
| | | | 361/525 |
| 2012/0044615 A1 | 2/2012 | Takahashi et al. | |
| 2012/0057275 A1 | 3/2012 | Intelmann et al. | |
| 2012/0182667 A1* | 7/2012 | Ueda | H01G 9/028 |
| | | | 361/525 |
| 2014/0328007 A1 | 11/2014 | Endo | |
| 2015/0140203 A1 | 5/2015 | Intelmann et al. | |
| 2015/0262754 A1* | 9/2015 | Nagashima | H01G 9/028 |
| | | | 427/79 |

FOREIGN PATENT DOCUMENTS

| | | | |
|---|---|---|---|
| JP | 2008182098 A | * | 8/2008 |
| JP | 2012-043958 | | 3/2012 |
| JP | 2012-517113 | | 7/2012 |
| WO | 2013/081099 | | 6/2013 |

OTHER PUBLICATIONS

English Translation of Chinese Search Report dated Jun. 19, 2018 for the related Chinese Patent Application No. 201680007819.8.

* cited by examiner

ELECTROLYTIC CAPACITOR WITH CONDUCTIVE POLYMER LAYER

RELATED APPLICATIONS

This application is a Continuation of International Application No. PCT/JP2016/000520, filed on Feb. 2, 2016, which in turn claims priority from Japanese Patent Application No. 2015-020605, filed on Feb. 4, 2015, the contents of all of which are incorporated herein by reference in their entireties.

BACKGROUND

1. Technical Field

The present disclosure relates to an electrolytic capacitor having a conductive polymer layer, and a method for manufacturing the electrolytic capacitor.

2. Description of the Related Art

Recently, a small-sized and large capacitance capacitor for high frequency applications has been desired along with downsizing and lightening of electronic devices. As such a capacitor, an electrolytic capacitor having small equivalent series resistance (ESR) and excellent frequency characteristics has been developed. The electrolytic capacitor includes an anode body including a valve metal such as tantalum, niobium, titanium, and aluminum, a dielectric layer formed on the anode body, and a cathode body. Particularly, an electrolytic capacitor having, as a cathode member, a conductive polymer layer (solid electrolyte layer) including a conductive polymer, which is formed on the dielectric layer is referred to as a solid electrolytic capacitor.

From the viewpoint of enhancing strength of the conductive polymer layer, it is considered that the conductive polymer layer is configured so as to have a multilayer structure, and a cross-linking agent is used in forming an outer conductive polymer layer. For example, in International Publication WO2010/089111 (Published Japanese Translation No. 2012-517113), first, a conductive polymer layer is formed, and then the conductive polymer layer is immersed in a solution containing a cross-linking agent, followed by drying, and further the conductive polymer layer is immersed in a dispersion liquid containing a conductive polymer, followed by drying in order to form an outer conductive polymer layer (polymer outer layer). In International Publication WO2010/089111 (Published Japanese Translation No. 2012-517113), as described above, the cross-linking agent is used before forming the polymer outer layer in order to suppress peeling of the conductive polymer layer and to enhance covering properties of the conductive polymer layer on an end of a capacitor element.

SUMMARY

An electrolytic capacitor according to one aspect of the present disclosure includes an anode body, a dielectric layer, a first conductive polymer layer, a second conductive polymer layer, and a first intermediate layer. The dielectric layer is formed on the anode body. The first conductive polymer layer covers at least a part of the dielectric layer. The second conductive polymer layer covers at least a part of the first conductive polymer layer. The first intermediate layer is formed between the first conductive polymer layer and the second conductive polymer layer. Further, the first intermediate layer includes a cationic agent and an anionic agent, and the first intermediate layer has a first region and a second region, the first region facing the first conductive polymer layer, the second region facing the second conductive polymer layer. The first region contains a greater amount of an anionic agent than the second region, and the second region contains a greater amount of a cationic agent than the first region.

A method for manufacturing an electrolytic capacitor according to another one aspect of the present disclosure includes the following steps. First step; an anode body is prepared. Second step: a dielectric layer is formed on the anode body. Third step: a first conductive polymer layer is formed by impregnating the anode body having the dielectric layer formed on the anode body with a first treatment liquid containing a first conductive polymer or a raw material of the first conductive polymer. Fourth step: a second treatment liquid containing an anionic agent is brought into contact with the anode body having the first conductive polymer layer formed on the anode body. Fifth step: a third treatment liquid containing a cationic agent is brought into contact with the anode body having brought into contact with the second treatment liquid. Sixth step: a second conductive polymer layer is formed by impregnating the anode body having brought into contact with the third treatment liquid with a fourth treatment liquid containing a second conductive polymer or a raw material of the second conductive polymer.

The present disclosure can provide an electrolytic capacitor in which ESR is reduced and an increase of the leakage current is suppressed, and a method for manufacturing the electrolytic capacitor.

DETAILED DESCRIPTION OF EMBODIMENT

Figure 1:
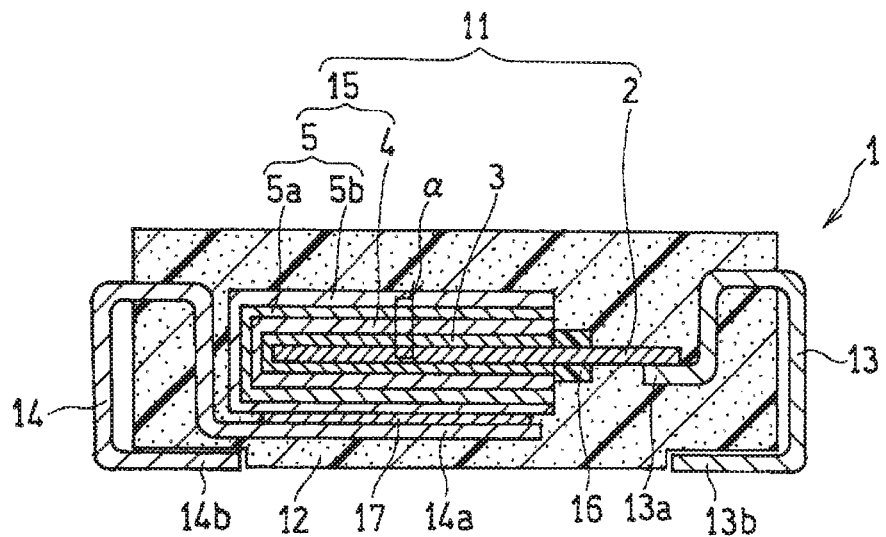
FIG. 1 is a schematic sectional view illustrating an electrolytic capacitor according to an exemplary embodiment of the present disclosure.

Prior to describing an exemplary embodiment of the present disclosure, problems in a conventional electrolytic capacitor will be described.

Even when a cross-linking agent described in International Publication WO2010/089111 (Published Japanese Translation No. 2012-517113) is used, there may be cases where the ESR cannot be reduced and the leakage current is increased since it is difficult to adequately enhance covering properties of the conductive polymer layer.

In order to solve the problems, the present disclosure provides a technique capable of reducing ESR and suppressing an increase of the leakage current in an electrolytic capacitor having a conductive polymer layer.

The exemplary embodiments of the electrolytic capacitor and the method for manufacturing the electrolytic capacitor of the present disclosure are described below with reference to the drawings as required.

(Electrolytic Capacitor)

An electrolytic capacitor according to an exemplary embodiment of the present disclosure includes an anode body, a dielectric layer formed on the anode body, a first conductive polymer layer covering at least a part of the dielectric layer, a second conductive polymer layer covering at least a part of the first conductive polymer layer, and an intermediate layer (first intermediate layer) formed between the first conductive polymer layer and the second conductive polymer layer. The first intermediate layer includes a cationic agent and an anionic agent, and the first intermediate layer has a first region and a second region, the first region facing the first conductive polymer layer, the second region facing the second conductive polymer layer. The first region contains a greater amount of an anionic agent than the second region, and the second region contains a greater amount of a cationic agent than the first region.

In the electrolytic capacitor, a thickness of the conductive polymer layer is required to be increased to some extent in order to suppress the leakage current and reduce the ESR. In order to increase the thickness of the conductive polymer layer, it is required that a film-forming step, which uses a treatment liquid containing a conductive polymer or a raw material of the conductive polymer, is repeated to laminate conductive polymer layers. However, the conductive polymer layer usually includes an anionic dopant together with a conductive polymer, and the dopant tends to be present at a surface of each conductive polymer layer. That is, each conductive polymer layer tends to be negatively charged at its surface. Thus, for example, even though lamination of the second conductive polymer layer on the first conductive polymer layer is attempted, actually, it is difficult to form the second conductive polymer layer on the surface of the first conductive polymer layer.

Thus, it is considered to ensure a certain level of a film thickness by forming an intermediate layer on the surface of the first conductive polymer layer and then forming the second conductive polymer layer on the surface of the intermediate layer, or by repeating these steps. The surfaces of the first and second conductive polymer layers tend to be negatively charged, and therefore the surfaces of the first and second conductive polymer layers repel each other, resulting in a reduction of wettability of the second conductive polymer to the first conductive polymer layer. Accordingly, it is thought that when a cationic intermediate layer is formed using the cationic agent so that the surface of the first conductive polymer layer is positively charged, the wettability of the second conductive polymer to the first conductive polymer layer becomes better to facilitate lamination of the second conductive polymer layer. However, actually, the cationic agent has extremely low coating properties to the surface of the first conductive polymer layer, and thus an intermediate layer is hardly formed. Further, since the cationic agent is hardly dissociated, it is difficult to form the second conductive polymer layer with a large thickness on the surface of a film made of the attached cationic agent even when the cationic agent can be attached to the surface of the first conductive polymer.

According to an exemplary embodiment of the present disclosure, in forming the intermediate layer (first intermediate layer) between the first conductive polymer layer and the second conductive polymer layer, the electrolytic capacitor is adapted so as to make a difference in the distribution state of the cationic agent and the anionic agent between the first region facing the first conductive polymer layer of the first intermediate layer and the second region facing the second conductive polymer layer of the first intermediate layer. Specifically, the first region is formed so as to contain a greater amount of the anionic agent than the second region, and the second region is formed so as to contain a greater amount of the cationic agent than the first region. That is, in the first intermediate layer, the anionic agent is localized at the first conductive polymer layer side, and the cationic agent is localized at the second conductive polymer layer side. The cationic agent is thus localized in the second region including the surface of the first intermediate layer, and therefore the second conductive polymer layer is easily formed (that is, at least one of film-forming properties and covering properties of the second conductive polymer layer can be enhanced), and a thickness of the second conductive polymer layer can be increased. When the thickness is increased, the conductivity can be enhanced, the ESR can be reduced, and an increase of the leakage current can be suppressed. Further, when a large amount of the anionic agent is included in the first region facing the first conductive polymer layer, film-restoring properties of the dielectric layer can be enhanced. Thus, the leakage current can be further suppressed.

The distribution state of the cationic agent and the anionic agent as described above can be attained by bringing the first conductive polymer layer into contact with a second treatment liquid containing an anionic agent, then bringing the first conductive polymer layer into contact with a third treatment liquid containing a cationic agent, and further forming the second conductive polymer layer. The anionic agent has higher coating properties to the first conductive polymer layer than the cationic agent, and easily covers the first conductive polymer layer with a film of the anionic agent. When the cationic agent is applied onto the film of the anionic agent, the cationic agent is dissociated by contact with the anionic agent and the film is easily uniformly formed, and the second conductive polymer layer is easily formed by the dissociation of the cationic agent. Therefore, as described above, film formability of the second conductive polymer layer can be enhanced so that an increase of the leakage current can be suppressed.

Figure 2:
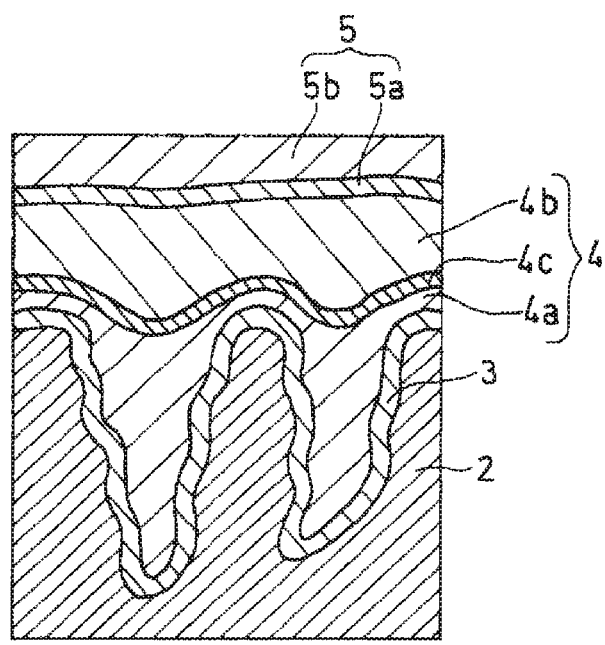
FIG. 2 is an enlarged view of an area surrounded by solid line a in FIG. 1.

FIG. 1 is a schematic sectional view illustrating an electrolytic capacitor according to an exemplary embodiment of the present disclosure. FIG. 2 is an enlarged view of an area surrounded by the solid line a in FIG. 1.

Electrolytic capacitor 1 includes capacitor element 11, resin outer packing 12 that seals capacitor element 11, and anode terminal 13 and cathode terminal 14 that are exposed to the outside of resin outer packing 12. Capacitor element 11 includes foil-like or plate-like anode body 2 (or an anode portion), dielectric layer 3 covering one end side of anode body 2, and cathode portion (or a cathode member) 15 covering dielectric layer 3. Anode terminal 13 is electrically connected to anode body 2, and cathode terminal 14 is electrically connected to cathode portion 15. Resin outer packing 12 has an almost rectangular parallelepiped outer shape, and therefore electrolytic capacitor 1 also has an almost rectangular parallelepiped outer shape.

Anode body 2 and cathode portion 15 are opposite to each other with dielectric layer 3 interposed between anode body 2 and cathode portion 15. Cathode portion 15 includes conductive polymer layer 4 covering dielectric layer 3 and cathode layer 5 covering conductive polymer layer 4. Cathode layer 5 shown in the drawings has a two-layer structure, and includes carbon layer 5a in contact with conductive polymer layer 4 and silver paste layer 5b covering a surface of carbon layer 5a.

In an area facing cathode portion 15 of the other end of anode body 2, the other end protruding from cathode portion 15, separation part 16, which is insulating, is formed so as to zonally cover a surface of anode body 2 to regulate contact between cathode portion 15 and anode body 2. The other end of anode body 2, protruding from cathode portion 15, is electrically connected to first end 13a of anode terminal 13 by welding or the like. Meanwhile, cathode layer 5 formed as an outermost layer of cathode portion 15 is electrically connected to first end 14a of cathode terminal 14 via conductive adhesive material 17 (e.g. a mixture of a thermosetting resin and metal particles). Second end 13b of anode terminal 13 and second end 14b of cathode terminal 14 are drawn out from different side surfaces of resin outer packing 12, and each extend to one main flat surface (lower surface in FIG. 1) in an exposed state. The exposed parts of the terminals on the flat surface are used for, for example, solder connection to a substrate (not shown in the drawings) on which electrolytic capacitor 1 is to be mounted.

Dielectric layer 3 is formed on a part of a surface of a conductive material constituting anode body 2. Specifically, dielectric layer 3 can be formed by anodizing the surface of the conductive material constituting anode body 2. Accordingly, dielectric layer 3 is formed along a surface (including an inner wall surface of pores or pits at a surface of the inside) of anode body 2 as shown in FIG. 2.

First conductive polymer layer 4a is formed so as to cover dielectric layer 3, and second conductive polymer layer 4b is formed so as to cover first conductive polymer layer 4a. And, intermediate layer (first intermediate layer) 4c is formed between first conductive polymer layer 4a and second conductive polymer layer 4b. In an example shown in the drawing, first intermediate layer 4c is formed so as to cover first conductive polymer layer 4a, and second conductive polymer layer 4b is formed so as to cover first intermediate layer 4c.

First conductive polymer layer 4a does not have to necessarily cover a whole (a whole surface) of dielectric layer 3, but has only to be formed so as to cover at least a part of dielectric layer 3; however, first conductive polymer layer 4a is desirably formed so as to cover as much of area of dielectric layer 3 as possible. Similarly, each of second conductive polymer layer 4b and first intermediate layer 4c does not have to necessarily cover a whole (a whole surface) of first conductive polymer layer 4a, but has only to be formed so as to cover at least a part of first conductive polymer layer 4a; however, each of second conductive polymer layer 4b and first intermediate layer 4c is desirably formed so as to cover as much of area of first conductive polymer layer 4a as possible. In an example shown in the drawing, first conductive polymer layer 4a, second conductive polymer layer 4b and first intermediate layer 4c are shown as conductive polymer layer 4, and there may be cases where in general, a layer including a conductive polymer, such as first conductive polymer layer 4a, second conductive polymer layer 4b or conductive polymer layer 4, may be referred to as a solid electrolyte layer.

Dielectric layer 3 is formed along the surface of anode body 2, and therefore irregularities are formed on the surface of dielectric layer 3 in accordance with a shape of the surface of anode body 2. First conductive polymer layer 4a is preferred to be formed so as to fill such irregularities of dielectric layer 3.

In the configuration described above, anode body 2 is an anode member of capacitor element 11, and first conductive polymer layer 4a, second conductive polymer layer 4b and cathode layer 5 are each a cathode member of capacitor element 11. Dielectric layer 3 is a dielectric member of capacitor element 11.

A configuration of the electrolytic capacitor is described in more detail below.

(Anode Body)

A conductive material having a large surface area can be used as the anode body. Examples of the conductive material include a valve metal, an alloy containing a valve metal, and a compound containing a valve metal. One of these materials can be used alone, or two or more of these materials can be used in combination. As the valve metal, for example, at least one selected from among titanium, tantalum, aluminum and niobium is preferred to be used. These metals are suitable as a constituent material of the anode body because oxides of these metals have a high dielectric constant. Examples of the anode body include one obtained by roughening a surface of a substrate (e.g. a foil- or plate-like substrate) formed from a conductive material, a molded body that is prepared from particles of a conductive material, and a sintered body obtained by sintering the molded body.

(Dielectric Layer)

The dielectric layer is formed by anodizing, through an anodizing treatment or the like, a conductive material on the surface of the anode body, and therefore the dielectric layer includes an oxide of the conductive material (particularly, a valve metal). For example, when tantalum is used as the valve metal, the dielectric layer includes $Ta_2O_5$, and when aluminum is used as the valve metal, the dielectric layer includes $Al_2O_3$. The dielectric layer is not limited to these examples, and it is sufficient that the layer functions as a dielectric body.

When the anode body is a foil- or plate-like anode body, and a surface of the anode body is roughened, the dielectric layer is formed along an inner wall surface of pores or pits at a surface of an inside of anode body 2 as shown in FIG. 2.

(First Conductive Polymer Layer)

The first conductive polymer layer has only to be formed so as to cover at least a part of a dielectric layer and may be formed so as to cover a whole surface of the dielectric layer.

The first conductive polymer layer includes a first conductive polymer. The first conductive polymer layer further includes a dopant. The dopant may be included in the first conductive polymer layer in a state of being doped in the first conductive polymer. The dopant may be included in the first conductive polymer layer in a state of being bonded to the first conductive polymer.

(First Conductive Polymer)

As the first conductive polymer, a publicly known polymer, e.g. a π-conjugated conductive polymer, used for an electrolytic capacitor, can be used. Examples of such a conductive polymer include a polymer having, as a basic skeleton, at least one selected from among polypyrrole, polythiophene, polyfuran, polyaniline, polyacetylene, polyphenylene, polyphenylene vinylene, polyacene, polythiophene vinylene and the like.

Such a polymer includes a homopolymer, a copolymer of two or more kinds of monomers, and a derivative (e.g. a substitute having a substituent) of these polymers. Examples of polythiophene include poly(3,4-ethylenedioxythiophene). Such a conductive polymer has high conductivity and is excellent in ESR characteristics.

One of the conductive polymers may be used alone, or two or more of the conductive polymers may be used in combination.

A weight average molecular weight of the conductive polymer is not particularly limited, and ranges, for example, from 1,000 to 1,000,000, both inclusive.

(Dopant)

As the dopant, for example, a low-molecular-weight compound (also referred to as a low-molecular-weight dopant) or a high-molecular-weight compound (also referred to as a high-molecular-weight dopant) is used, which has an acid group (or an anionic group). When the high-molecular-weight dopant is used, a more homogeneous first conductive polymer layer can be formed. One of the dopants can be used alone or two or more of the dopants can be used in combination.

As the low-molecular-weight dopant, a compound (low-molecular-weight compound (monomer compound)) can be used, which has at least one anionic group selected from among a sulfonate group, a carboxyl group, a phosphate group (—O—P(=O)(—OH)$_2$, a phosphonate group (—P(=O)(—OH)$_2$) and the like. As such a compound, for example, a cyclic compound can be used, in which an anionic group is bonded to an aromatic ring (e.g. a $C_{6-14}$ aromatic ring) of benzene, naphthalene, anthracene, or the like, or to a fused ring of an aromatic ring (e.g. a $C_{6-14}$ aromatic ring) and an aliphatic ring. As the anionic group, the sulfonate group is preferred, and a combination of the sulfonate group with an anionic group other than the sulfonate group is also acceptable. The aromatic ring and/or the aliphatic ring constituting a cyclic compound may also include a substituent (e.g. an alkyl group such as a methyl group, and an oxo group (=O)), other than the anionic group. Specific examples of such a compound include an alkylbenzene sulfonic acid such as benzenesulfonic acid and p-toluenesulfonic acid, naphthalenesulfonic acid, and anthraquinone sulfonic acid.

As the high-molecular-weight dopant, for example, a high-molecular-weight compound can be used, which has at least one anionic group selected from among a sulfonate group, a phosphate group (—OP(=O)(—OH)$_2$, a phosphonate group (—P(=O)(—OH)$_2$) and the like. Among the anionic groups, the sulfonate group is preferred. Examples of the high-molecular-weight dopant having a sulfonate group include a homopolymer or a copolymer of a monomer having a sulfonate group (e.g. a vinyl monomer having a sulfonate group and a diene monomer having a sulfonate group, such as isoprenesulfonic acid). Examples of the vinyl monomer having a sulfonate group include aliphatic vinyl monomers having a sulfonate group, such as vinylsulfonic acid, allylsulfonic acid, and 2-acrylamido-2-methylpropanesulfonic acid, and aromatic vinyl monomers having a sulfonate group, such as styrenesulfonic acid. One of these vinyl monomers can be used alone, or two or more of these vinyl monomers may be used in combination. The copolymer may be a copolymer obtained from two or more kinds of monomers having a sulfonate group, or may be a copolymer of a monomer having a sulfonate group and another monomer (e.g. a monomer including an anionic group (excluding a sulfonate group) such as a carboxyl group (anionic monomer)). The high-molecular-weight dopant also includes, for example, polyester sulfonic acid and/or a phenolsulfonic acid novolak resin.

In the low-molecular-weight dopant and the high-molecular-weight dopant, the anionic group is not particularly limited as long as it can produce an anion in a state of being dissociated, and may be a salt or ester of the above-mentioned anionic group.

A weight average molecular weight of the high-molecular-weight dopant ranges, for example, from 1,000 to 1,000,000, both inclusive, preferably from 10,000 to 500,000, both inclusive. When a high-molecular-weight dopant having such a molecular weight is used, the first conductive polymer layer is easily homogenized. In the cases of the homopolymer and the copolymer of a monomer having a sulfonate group, the weight average molecular weight more preferably ranges from 10,000 to 500,000, both inclusive. In the cases of the polyester sulfonic acid and the phenolsulfonic acid novolak resin, the weight average molecular weight more preferably ranges from 5,000 to 80,000, both inclusive.

An amount of the dopant included in the first conductive polymer layer preferably ranges from 10 parts by mass to 1,000 parts by mass, both inclusive, more preferably from 50 parts by mass to 200 parts by mass, both inclusive, with respect to 100 parts by mass of the first conductive polymer.

The anode body has a large surface area, and the dielectric layer is formed not only on an outer surface, but also along an inner wall surface of pores or pits at a surface of the inside. It is preferred that the first conductive polymer layer be also formed on such a dielectric layer formed along the inner wall surface of the anode body so that coverage by the first conductive polymer layer be increased.

(First Intermediate Layer)

The first intermediate layer may be formed so as to cover at least a part of the first conductive polymer layer, and may also be formed so as to cover the whole surface of the first conductive polymer layer. In an area where the first conductive polymer layer is not formed, the first intermediate layer may be in contact with the dielectric layer (in other words, the first intermediate layer may be formed so as to cover the dielectric layer in a part of an area of the dielectric layer). Further, a part of the first intermediate layer may infiltrate the first conductive polymer layer.

The first intermediate layer has the first region facing the first conductive polymer layer and the second region facing the second conductive polymer layer. When the first intermediate layer is divided into two portions at a plane passing through a center of a thickness direction, a region close to the first conductive polymer layer is referred to as the first region, and a region close to the second conductive polymer layer is referred to as the second region.

The first region may contain a greater amount of the anionic agent than the second region, and may contain only the anionic agent among the anionic agent and the cationic agent, or may contain both the anionic agent and the cationic agent. The second region may contain a greater amount of the cationic agent than the first region, and may contain only the cationic agent among the anionic agent and the cationic agent, or may contain both the cationic agent and the anionic agent.

(Anionic Agent)

The anionic agent has an anionic group. Examples of the anionic group include a sulfonate group, a phosphate group, a phosphonate group, a borate group, a carboxyl group and the like. Among these anionic groups, a sulfonate group, a phosphate group, and a phosphonate group (particularly, a sulfonate group) are preferred.

In the first intermediate layer or a treatment liquid for forming the first intermediate layer, the anionic group of the anionic agent is not particularly limited as long as it can produce anions in a state of being dissociated, and may be contained in any form of the above-mentioned anionic group, an anion corresponding to the anionic group and/or a salt of the anion. Accordingly, for example, the sulfonate group includes a free sulfonate group (—SO$_3$H), a sulfonate anion (—SO$_3^-$), a sulfonate and the like. The phosphate group includes a free phosphate group (—OP(=O)(OH)$_2$), a phosphate anion (—OPO$_3$H$^-$, —OPO$_3^{2-}$), a phosphate and the like. The phosphonate group includes a free phosphonate group (—P(=O)(OH)$_2$), a phosphonate anion (—PO$_3$H$^-$, —PO$_3^{2-}$), a phosphonate and the like. The carboxyl group includes a free carboxyl group (—COOH), a carboxylate anion (—COO$^-$), a carboxylate and the like.

Examples of the anionic agent include low-molecular-weight compounds (monomer compounds) and high-molecular-weight compounds (polymers). The anionic agent may contain one kind of anionic group, or may contain two or more kinds of anionic groups. An anionic agent that is a monomer compound is referred to as a first anionic agent and an anionic agent that is a polymer is referred to as a second anionic agent. One of the anionic agents may be used alone, or two or more of the anionic agents may be used in combination. Two or more of the first anionic agents or the second anionic agents may be used, or one or two or more of the first anionic agents may be combined with one or two or more of the second anionic agents.

(First Anionic Agent)

The first anion agent that is a monomer compound may be any of an aliphatic compound, an alicyclic compound and an aromatic compound. The aliphatic compound has an anionic group and an aliphatic site (alkane site ($C_{1-6}$ alkane site) such as methane and ethane) to which the anionic group is bonded. The alicyclic compound has an anionic group and an alicyclic site (cycloalkane site ($C_{5-8}$ cycloalkane site) such as cyclopentane and cyclohexane) to which the anionic group is bonded. The aromatic compound has an anionic group and an aromatic site (arene site ($C_{6-14}$ arene site) such as benzene and naphthalene) to which the anionic group is bonded. When the anionic agent having the alicyclic site and the aromatic site (particularly, the aromatic site) is used, affinity for the first conductive polymer layer is easily enhanced, and therefore the first intermediate layer is easily formed, and the anionic agent is advantageous from the view of increasing the thickness of the second conductive polymer layer.

In the first anionic agent, a number of anionic groups may be one, or may be two or more (e.g. 2, 3 or 4).

Each of the aliphatic site, the alicyclic site and the aromatic site may have at least one substituent selected from among halogen atoms (fluorine element, chlorine atom, etc.), alkyl groups ($C_{1-4}$ alkyl groups such as methyl and ethyl), alkenyl groups ($C_{2-6}$ alkenyl groups such as a vinyl group) and a hydroxyl group.

Examples of the first anion agents having a sulfonate group as the anionic group include aliphatic sulfonic acids ($C_{1-8}$ alkanesulfonic acids such as methanesulfonic acid), alicyclic sulfonic acids ($C_{5-8}$ cycloalkanesulfonic acids such as cyclohexanesulfonic acid), aromatic sulfonic acids ($C_{6-14}$ arene sulfonic acids such as benzenesulfonic acid, styrenesulfonic acid, toluenesulfonic acid and naphthalenesulfonic acid), and the like.

Examples of the first anion agents having a phosphate group as the anionic group include acid phosphoxypolyoxy alkylene glycol monoacrylates of carboxylic acid (acid phosphoxypolyoxy ethylene glycol mono(meth)acrylate $(P(=O)(OH)_2—(O—CH_2CH_2)_n—O—C(=O)—CR=CH_2)$ (n is an integer of 2 to 10, and R is a hydrogen atom or a methyl group), etc.) such as acid phosphoxyethyl acrylate and acid phosphoxyethyl methacrylate, and the like.

Examples of the first anion agents having a phosphonate group as the anionic group include aliphatic phosphonic acids such as vinylphosphonic acid, aromatic phosphonic acids such as phenylphosphonic acid, and the like.

Examples of the first anion agents having a carboxyl group as the anionic group include aliphatic carboxylic acids ($C_{2-10}$ alkanecarboxylic acids such as propanoic acid, butanoic acid and hexanoic acid, $C_{4-12}$ alkanedicarboxylic acids such as hexanedioic acid, etc.), alicyclic carboxylic acids (carboxy $C_{5-8}$ cycloalkanes such as carboxycyclohexane, dicarboxy $C_{5-8}$ cycloalkanes such as cyclohexanedicarboxylic acid, etc.), aromatic carboxylic acids (carboxy $C_{6-14}$ arenes such as benzoic acid, carboxyhydroxy $C_{8-14}$ arenes such as salicylic acid, dicarboxy $C_{8-14}$ arenes such as phthalic acid, isophthalic acid, terephthalic acid and naphthalenedicarboxylic acid), and the like.

Examples of the first anion agents having a sulfonate group and a carboxyl group as the anionic group include aliphatic compounds such as sulfosuccinic acid, and aromatic compounds such as sulfobenzoic acid, sulfosalicylic acid, disulfosalicylic acid, sulphophthalic acid, sulfoisophthalic acid, sulfoterephthalic acid, and naphtholsulfonic acid. Examples of the first anion agents having a phosphate group and a carboxyl group as the anionic group include 2-(dihydroxyphosphinyloxy)acrylic acid and the like. Examples of the first anion agents having a phosphonate group and a carboxyl group as the anionic group include phosphonoacrylic acid, and/or 2-methyl-3-phosphonoacrylic acid, and the like.

Among the first anionic agents, an anionic agent having at least a sulfonate group is preferred. It is also preferred to use an anionic agent having a phosphate group and/or a phosphonate group from the viewpoint of enhancing a withstand voltage or further suppressing the leakage current.

(Second Anionic Agent)

Examples of the second anionic agent that is a polymer (high-molecular-weight compound) include a homopolymer or copolymer of a monomer unit having an anionic group. The second anionic agent may contain one kind or two or more kinds of monomer units having an anionic group. In the monomer unit, a number of anionic groups may be one, or two or more. One of the second anionic agents may be used alone, or two or more of the second anionic agents may be used in combination.

Examples of a monomer unit serving as a skeleton of the monomer unit having an anionic group include aliphatic vinyl monomer units such as ethylene and propylene, aromatic vinyl monomer units such as styrene, diene monomer units such as butadiene and isoprene, and the like.

The copolymer may include a monomer unit having an anionic group (second anionic group) different from the first anionic group, and/or other copolymerizable monomer units in addition to the monomer unit having an anionic group (first anionic group). The second anionic group can be appropriately selected from the groups as mentioned above as examples.

Examples of the monomers having a sulfonate group as the first or second anionic group include a vinyl monomer having a sulfonate group and a diene monomer having a sulfonate group such as isoprenesulfonic acid. Examples of the vinyl monomers having a sulfonate group include aliphatic vinyl monomers having a sulfonate group such as vinylsulfonic acid and allylsulfonic acid, and aromatic vinyl monomers having a sulfonate group such as styrenesulfonic acid. One of the monomers having a sulfonate group can be used alone, or two or more of the monomers can be used in combination.

Examples of the monomers having a phosphate group as the first or second anionic group include acid phosphoxypolyoxy alkylene glycol monoacrylates of polymerizable unsaturated carboxylic acid (acid phosphoxypolyoxy ethylene glycol mono(meth)acrylate $(P(=O)(OH)_2—(O—CH_2CH_2)_n—O—C(=O)—CR=CH_2)$ (n is an integer of 2 to 10, and R is a hydrogen atom or a methyl group), etc.) such as acid phosphoxyethyl acrylate and acid phosphoxyethyl methacrylate, and the like. In addition, acid phosphoxyalkyl groups such as acid phosphoxyethyl are alkyl groups having a phosphate group. Acrylate and methacrylate are collectively referred to as (meth)acrylate. One of the monomers having a phosphate group can be used alone, or two or more of the monomers can be used in combination.

Examples of the monomers having phosphonic acid as the first or second anionic group include aliphatic vinyl monomers having a phosphonate group such as vinylphosphonic acid or allylphosphonic acid, and aromatic vinyl monomers having a phosphonate group such as styrenephosphonic acid. One of the monomers having a phosphonate group can be used alone, or two or more of the monomers can be used in combination.

Examples of the monomers having a carboxyl group as the first or the second anionic group include acrylic acid, methacrylic acid, maleic acid, fumaric acid, carboxystyrene, and the like. One of the monomers having a carboxyl group can be used alone, or two or more of the monomers can be used in combination.

Examples of the monomers having a sulfonate group and a carboxyl group as the anionic group include aromatic vinyl monomers having a sulfonate group and a carboxyl group, such as vinylsulfobenzoic acid. One of these monomers can be used alone, or two or more of these monomers can be used in combination.

Examples of the monomers having a phosphate group as the first anionic group and a carboxyl group as the second anionic group include 2-(dihydroxyphosphinyloxy)acrylic acid and the like. Examples of the monomers having a phosphonate group as the second anionic group and a carboxyl group as the second anionic group include phosphonoacrylic acid, and/or 2-methyl-3-phosphonoacrylic acid, and the like.

In the copolymer, as other copolymerizable monomers, a copolymerizable monomer not having the anionic groups as mentioned above as examples can be used. Examples of the copolymerizable monomer include aliphatic vinyl monomers such as ethylene and propylene, aromatic vinyl monomers such as styrene, diene monomers such as butadiene and isoprene, and the like. Further, as the copolymerizable monomer, aromatic vinyl monomers having a hydroxyl group such as vinylphenol and hydroxyvinyltoluene, and hydroxyalkyl esters of copolymerizable monomers having a carboxyl group such as hydroxyethyl aclylate and hydroxyethyl methacrylate (e.g. hydroxy $C_{1-4}$ alkyl esters), and the like can also be used. One of these other copolymerizable monomers can be used alone, or two or more of these monomers can be used in combination.

One of the second anionic agents can be used alone, or two or more of the second anionic agents can be used in combination.

In the second anionic agent, the anionic group is preferably a sulfonate group or a phosphate group, and the second anionic agent may further contain a carboxyl group. In this case, an effect of suppressing corrosion of the anode body can be further enhanced while ensuring dissociation and solubility of the cationic agent. Thus, the leakage current can be more effectively suppressed. For the same reason, a case in which the second anionic agent contains at least the carboxyl group as the anionic group is also preferred. A case in which the second anionic agent contains the sulfonate group, the phosphate group and/or the phosphonate group as the anionic group is also preferred. In this case, withstand voltage characteristics can be enhanced.

A weight average molecular weight of the polymer ranges, for example, from 5,000 to 500,000, both inclusive, preferably from 10,000 to 200,000, both inclusive.

(Cationic Agent)

The cationic agent has a cationic group. The cationic agent is not particularly limited as long as it can produce cations in a state of being dissociated, and may be, for example, a metal compound (inorganic base such as metal hydroxide); however, the cationic agent is preferably an organic compound (organic base, and the like). As the cationic group of the cationic agent that is an organic compound, amino groups (primary amino group, secondary amino group, tertiary amino group, etc.), and quaternary ammonium groups are preferred. Such a cationic group also includes salts of amino groups, and salts of quaternary ammonium groups.

Among the cationic agents, cationic agents having an amino group (amine compounds, and the like) as a cationic group are preferred. Examples of the amine compounds include amines having 1 to 3 substituents (e.g. at least one selected from among an alkyl group, a cycloalkyl group, an aryl group, and the like) at a nitrogen atom (primary to tertiary amines), and diamines which may have 1 or 2 alkyl groups at a nitrogen atom.

Examples of the alkyl groups included in the amines or diamines include $C_{1-16}$ alkyl groups such as methyl, ethyl, 1-propyl, 2-propyl, 1-butyl, tert-butyl, hexyl, 2-ethylhexyl, octyl, decyl, dodecyl, and the like. The alkyl group may be any of a linear alkyl group and a branched alkyl group. It is preferred that at least one among alkyl groups included in ammonium cations is a $C_{4-16}$ alkyl group (or a $C_{6-12}$ alkyl group or a $C_{6-10}$ alkyl group). In the amines and the diamines, other alkyl groups may be $C_{1-10}$ alkyl groups (or $C_{1-6}$ alkyl groups or $C_{1-4}$ alkyl groups).

Examples of the cycloalkyl groups include $C_{4-10}$ cycloalkyl groups (or $C_{5-8}$ cycloalkyl groups) such as cyclopentyl, cyclohexyl, and cyclooctyl. Examples of the aryl groups include $C_{6-14}$ aryl groups such as phenyl and naphthyl.

Each of the alkyl group, the cycloalkyl group and the aryl group may have at least one substituent selected from among a hydroxyl group and an alkoxy group ($C_{1-6}$ alkoxy groups or $C_{1-4}$ alkoxy groups such as methoxy and ethoxy, or the like).

Examples of the above-mentioned diamines include diaminoalkane, diaminocycloalkanes (diamino $C_{5-8}$ cycloalkanes such as diaminocyclohexane, and the like), diaminoarenes (diamino $C_{6-14}$ arenes such as diaminobenzene and diaminonaphthalene, and the like), and the like. These diamines may have substituent such as a hydroxyl group and/or an alkoxy group ($C_{1-6}$ alkoxy groups or $C_{1-4}$ alkoxy groups such as methoxy and ethoxy, or the like) and the like in an alkane, a cycloalkane or an arene site.

Examples of diaminoalkane include diamino $C_{2-14}$ alkanes such as 1,4-diaminobutane, 1,6-diaminohexane, 1,8-diaminooctane, 1,10-diaminodecane and the like, and diamino $C_{4-12}$ alkanes. Each of nitrogen atoms of these diamines may have 1 or 2 alkyl groups. The alkyl group includes the alkyl groups as mentioned above as examples. The alkyl group may be any of a linear alkyl group and a branched alkyl group, and may have substituent such as a hydroxyl group and/or an alkoxy group ($C_{1-6}$ alkoxy groups or $C_{1-4}$ alkoxy groups such as methoxy and ethoxy, or the like) and the like.

As the amine, a primary amine and/or a tertiary amine may be used. Examples of the primary amine include $C_{4-16}$ alkylamines such as octyl amine and decyl amine. Examples of the tertiary amine include N,N-di$C_{1-10}$ alkyl-N—$C_{4-16}$ alkylamines such as N,N-dimethyl-octylamine, N,N-di$C_{4-16}$ alkyl-N—$C_{1-10}$ alkylamines, and tri$C_{4-16}$ alkylamines.

One of the cationic agents may be used alone, or two or more of the cationic agents may be used in combination.

The first intermediate layer may contain the cationic agent in any form of an amine compound, a cation corresponding to the amine compound, a quaternary ammonium compound and/or a salt of the cation. For example, in the first intermediate layer, the cationic agent may form a salt with the anionic agent.

(Second Conductive Polymer Layer)

The second conductive polymer layer may be formed so as to cover at least a part of the first conductive polymer layer, and may also be formed so as to cover the whole surface of the first conductive polymer layer. The second conductive polymer layer is formed so as to cover the first conductive polymer layer with the first intermediate layer interposed between the second conductive polymer layer and the first conductive polymer layer in at least a part of an area of the surface of the first conductive polymer layer. However, the second conductive polymer layer may be directly formed on the surface of the first conductive polymer layer without the first intermediate layer interposed between the second conductive polymer layer and the first conductive polymer in some areas. In an area where the first conductive polymer layer and the first intermediate layer are not formed, the second conductive polymer layer may be in contact with the dielectric layer (in other words, the second conductive polymer layer may be formed so as to cover the dielectric layer).

The second conductive polymer layer includes a second conductive polymer. The second conductive polymer layer may further include a dopant. The dopant may be included in the second conductive polymer layer in a state of being doped in the second conductive polymer. The dopant may be included in the second conductive polymer layer in a state of being bonded to the second conductive polymer.

(Second Conductive Polymer)

As the second conductive polymer, a publicly known polymer used for an electrolytic capacitor can be used. Specifically, a polymer can be appropriately selected from the conductive polymers mentioned as examples of the first conductive polymer. A weight average molecular weight of the second conductive polymer can also be appropriately selected from the ranges mentioned as examples of the first conductive polymer. The same conductive polymer or different conductive polymers may be used for the first conductive polymer and the second conductive polymer.

The second conductive polymer layer further includes a dopant. As the dopant, a publicly known dopant used for an electrolytic capacitor can be used. Specifically, a dopant can be appropriately selected from the dopants mentioned as examples of the first conductive polymer layer. The same dopant or different dopants may be used for the first conductive polymer layer and the second conductive polymer layer.

An amount of the dopant included in the second conductive polymer layer preferably ranges from 10 parts by mass to 1,000 parts by mass, both inclusive, more preferably from 50 parts by mass to 200 parts by mass, both inclusive, with respect to 100 parts by mass of the second conductive polymer.

An average thickness of the second conductive polymer layer ranges, for example, from 1 μm to 100 μm, both inclusive, preferably from 5 μm to 50 μm, both inclusive. According to the exemplary embodiment of the present disclosure, the cationic agent can be localized in the second region of the first intermediate layer, and therefore an average thickness of the second conductive polymer layer can be thus increased. Therefore, strength of the second conductive polymer layer can be enhanced, and the leakage current can be suppressed.

A ratio of the average thickness of the second conductive polymer layer to the average thickness of the first conductive polymer layer is, for example, 5 times or more, preferably 10 times or more. When the ratio of the average thickness falls within such a range, strength of the whole conductive polymer layer is easily enhanced.

Each of the first conductive polymer layer and the second conductive polymer layer may further contain a publicly known additive, and/or a publicly known conductive material (e.g. a conductive inorganic material such as manganese dioxide; and/or a TCNQ complex salt) other than the conductive polymer, as required.

A layer to enhance adhesion or the like may be interposed between the dielectric layer and the first conductive polymer layer.

Figure 3:
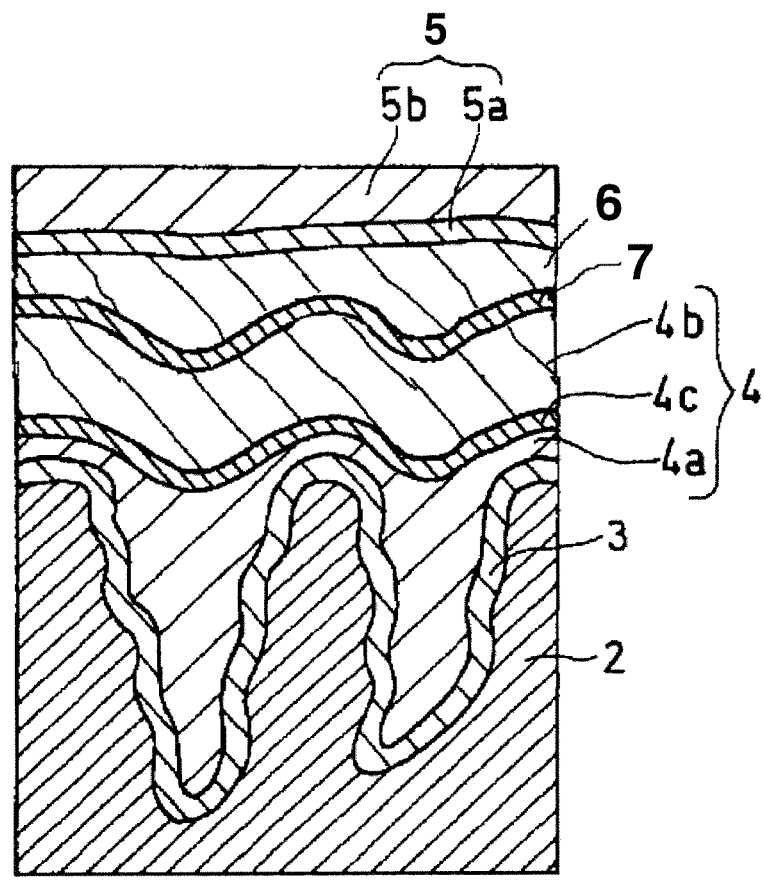
FIG. 3 is an enlarged view of an area surrounded by solid line a in FIG. 1 which has a second intermediate layer and a polymer layer.

Described in the above exemplary embodiment is a case in which the capacitor element has a two-layered conductive polymer layer of the first conductive polymer layer and the second conductive polymer layer. However the capacitor element may also have a three- or more layered conductive polymer layer. In this case, a third conductive polymer layer 6 may be formed so as to cover at least a part of the second conductive polymer layer, and an intermediate layer (second intermediate layer 7) may be formed between the second conductive polymer layer and the third conductive polymer layer 6, as shown in FIG. 3.

The second intermediate layer 7 may be formed in accordance with a publicly known method. However, the second intermediate layer 7 is preferably formed in the same manner as in the first intermediate layer from the viewpoint of increasing a thickness of the third conductive polymer layer 6.

The third conductive polymer layer 6 can be formed in the same manner as in the second conductive polymer layer. When the third conductive polymer layer 6 has a two- or more layer structure, an intermediate layer (second intermediate layer 7) may be formed between the layers, as required. This second intermediate layer 7 can be formed in the same manner as in the second intermediate layer 7 between the first conductive polymer layer and the second conductive polymer layer, and is preferably formed in the same manner as in the first intermediate layer from the viewpoint of increasing a thickness of the third conductive polymer layer 6.

The third conductive polymer layer 6 may have a one layer structure. The third conductive polymer layer 6 may have a two- or more layer structure. When a two- or more-layered third conductive polymer layer 6 is formed, the second intermediate layer 7 may be formed between neighboring third conductive polymer layers. According to the exemplary embodiment of the present disclosure, by forming the first intermediate layer, film-forming properties of the second conductive polymer layer can be enhanced, and a thickness of the second conductive polymer layer can be increased. When the second intermediate layer 7 is formed in the same manner as in the first intermediate layer, film-forming properties of the third conductive polymer layer 6 can also be enhanced, and a thickness of the third conductive polymer layer 6 can also be increased. Therefore, even when a number of layers of the conductive polymer layer is decreased, the leakage current can be adequately suppressed. A number of layers of the intermediate layer can be decreased, and therefore an effect of reducing ESR can be enhanced.

When the second intermediate layer 7 and the third conductive polymer layer 6 are formed, a thickness of each of the second conductive polymer layer and the third conductive polymer layer 6 preferably ranges from 1 μm to 100 μm, both inclusive, more preferably from 5 μm to 50 μm, both inclusive, or from 5 μm to 30 μm, both inclusive. When the thickness of the second conductive polymer layer falls within the range, an increase of the leakage current can be suppressed and the ESR can be reduced.

(Method for Manufacturing Electrolytic Capacitor)

A method for manufacturing an electrolytic capacitor according to an exemplary embodiment of the present disclosure includes: a first step of preparing an anode body; a second step of forming a dielectric layer on the anode body; a third step of forming a first conductive polymer layer by impregnating the anode body having the dielectric layer formed on the anode body with a first treatment liquid containing a first conductive polymer or a raw material of the first conductive polymer; a fourth step of bringing a second treatment liquid containing an anionic agent into contact with the anode body having the first conductive polymer layer formed on the anode body; a fifth step of bringing a third treatment liquid containing a cationic agent into contact with the anode body having brought into contact with the second treatment liquid; and a sixth step of forming a second conductive polymer layer by impregnating the anode body having brought into contact with the third treatment liquid with a fourth treatment liquid containing a second conductive polymer or a raw material of the second conductive polymer.

The steps are described in more detail below.

(First Step)

In the first step, an anode body is formed by a publicly known method according to a kind of the anode body.

The anode body can be prepared by, for example, roughening a surface of a foil- or plate-like substrate formed from a conductive material. It is sufficient that roughening can form irregularities on the surface of the substrate. Roughening may be conducted, for example, by subjecting the surface of the substrate to etching (e.g. electrolytic etching), or by depositing particles of a conductive material on the surface of the substrate using a gas phase method such as vapor deposition.

(Second Step)

In the second step, a dielectric layer is formed on the anode body. The dielectric layer is formed by anodizing a surface of the anode body. Anodization can be performed by a publicly known method, for example, an anodizing treatment. The anodizing treatment can be conducted, for example, by immersing the anode body in a anodizing solution to impregnate, with the anodizing solution, up to the surface (an inner wall surface of pores or pits at a surface of the inside) of the anode body, and applying a voltage between the anode body as an anode and a cathode immersed in the anodizing solution. As the anodizing solution, for example, an aqueous solution of phosphoric acid, an aqueous solution of ammonium phosphate, or an aqueous solution of ammonium adipate is preferred to be used.

(Third Step)

In the third step, for example, by immersing the anode body having the dielectric layer formed on the anode body with a first treatment liquid or by injecting the first treatment liquid to the anode body having the dielectric layer formed on the anode body, the anode body is impregnated with the first treatment liquid. Up to a surface of the anode body having the dielectric layer formed on the anode body (an inner wall surface of pores or pits at a surface of the inside on which the dielectric layer is formed) can be impregnated with the first treatment liquid by immersion or liquid injection. After impregnating with the first treatment liquid, the anode body may be dried as required. During drying, the anode body may be heated as required. The first conductive polymer (and dopant) can be attached to a surface of the anode body having the dielectric layer formed on the anode body by the third step. A treatment with the first treatment liquid (specifically, impregnation of the anode body with the first treatment liquid) and drying may be repeated as a series of steps, as required.

In the third step, the first conductive polymer (and dopant) is attached to a surface of the anode body having the dielectric layer formed on the anode body in the form of a film to form a first conductive polymer layer. The first conductive polymer layer may be a film (or a coating film) formed by bringing the anode body having the dielectric layer formed on the anode body into contact with the first treatment liquid, followed by drying. The first treatment liquid is not particularly limited, and may be brought into contact with the surface of the anode body having the dielectric layer formed on the anode body by not only various coating methods (e.g. an immersion method (dip-coating method) and a spray-coating method) but also a printing method or a combination of these methods, for example.

Examples of the first treatment liquid containing the first conductive polymer include a solution containing a solvent and the first conductive polymer dissolved in the solvent, and a dispersion liquid containing a dispersion medium and a dispersoid (or a dispersion phase) of the first conductive polymer dispersed in the dispersion medium. When such a solution or a dispersion liquid is used as the first treatment liquid, the first conductive polymer layer can be easily formed, and a first conductive polymer layer stable in quality is easily obtained. Particularly, use of the dispersion liquid is preferred. A form of the dispersoid in the dispersion liquid is not particularly limited, and the form may be a fiber, but is preferred to be particles (or a powder). An average particle size of dispersoid particles in the dispersion liquid preferably ranges from 5 nm to 500 nm, both inclusive. The average particle size can be determined, for example, from a particle size distribution obtained by a dynamic light scattering method.

Examples of the solvent or the dispersion medium contained in the first treatment liquid include water, an organic medium, and a mixture of water and the organic medium. An example of the organic medium includes at least one selected from among aliphatic alcohols having 1 to 5 carbon atoms (e.g. aliphatic monools such as methanol, ethanol, propanol and 1-butanol; and aliphatic polyols such as ethylene glycol and glycerin); aliphatic ketones such as acetone; nitriles such as acetonitrile and benzonitrile; amides such as N,N-dimethylformamide; and sulfoxides such as dimethyl sulfoxide.

The first treatment liquid can contain a component (e.g. a dopant) other than the first conductive polymer among the aforementioned constituent components of the first conductive polymer layer, as required.

In the third step, the first conductive polymer layer may also be formed by impregnating the anode body having the dielectric layer formed on the anode body with the first treatment liquid containing a raw material of the first conductive polymer, followed by polymerization (chemical polymerization, electrolytic polymerization, or the like). Examples of the raw material of the first conductive polymer include a precursor of the first conductive polymer, for example, a monomer constituting the first conductive polymer and/or an oligomer in which some monomers are linked to each other.

For formation of the polymerized film, an oxidant is used for polymerizing the raw material of the first conductive polymer. The oxidant may be added to the first treatment liquid. The oxidant may be applied onto the anode body before or after the anode body having the dielectric layer formed on the anode body is impregnated with the first treatment liquid. Examples of such an oxidant include a metal sulfonate. The metal sulfonate also has a function as a dopant in addition to a function as an oxidant. Examples of a moiety constituting a sulfonic acid of the metal sulfonate include an alkyl sulfonic acid and/or an aromatic sulfonic acid (e.g. benzenesulfonic acid, toluenesulfonic acid, and naphthalenedisulfonic acid). An example of a metal moiety constituting a metal salt includes at least one selected from among iron (III), copper (II), chromium (IV) and zinc (II).

The first treatment liquid used for forming the polymerized film can contain a solvent. As the solvent, a solvent can be appropriately selected from the solvents mentioned as examples of the first treatment liquid used for forming the above film (coating film).

The first treatment liquid used for forming the polymerized film can also contain a component (e.g. a dopant) other than (a raw material of) the first conductive polymer among the above constituent components of the first conductive polymer layer, as required.

(Fourth Step)

In the fourth step, a second treatment liquid containing an anionic agent is brought into contact with the anode body having the first conductive polymer layer formed on the anode body. Specifically, the fourth step can be performed by applying or spraying the second treatment liquid onto the anode body having the first conductive polymer attached thereto (or having the first conductive polymer layer formed on the anode body), or by impregnating the anode body with the second treatment liquid (e.g. immersing the anode body in the second treatment liquid, or injecting the second treatment liquid to the anode body). The anode body may be dried as required after bringing the anode body into contact with the second treatment liquid. During drying, the anode body may be heated as required.

The second treatment liquid may also include a solvent in addition to the anionic agent. Examples of the solvent include water, an organic medium, and a mixture of water and the organic medium. An example of the organic medium includes at least one selected from among alkanes having 5 to 8 carbon atoms, such as pentane, hexane and octane, aliphatic alcohols having 1 to 5 carbon atoms (e.g. aliphatic monools such as methanol, ethanol, propanol and 1-butanol; and aliphatic polyols such as ethylene glycol and glycerin); aliphatic ketones such as acetone and ethyl methyl ketone (MEK); aliphatic esters such as ethyl acetate and butyl acetate; nitriles such as acetonitrile and benzonitrile; amides such as N,N-dimethylformamide; and sulfoxides such as dimethyl sulfoxide. The solvent preferably contains at least water.

In the fourth step, the anionic agent is desirably attached so as to cover the first conductive polymer (and dopant) that is attached to the surface of the dielectric layer, and is preferably attached in the form of a film to form a layer.

(Fifth Step)

In the fifth step, a third treatment liquid containing a cationic agent is brought into contact with the anode body impregnated with the second treatment liquid. Specifically, the fifth step can be performed by applying or spraying the third treatment liquid onto the anode body having brought into contact with the second treatment liquid, or by impregnating the anode body with the third treatment liquid (e.g. immersing the anode body in the third treatment liquid, or injecting the third treatment liquid to the anode body). The anode body may be dried as required after bringing the anode body into contact with the third treatment liquid. During drying, the anode body may be heated as required.

The third treatment liquid may also include a solvent in addition to the cationic agent. Examples of the solvent include water, an organic medium, and a mixture of water and the organic medium, and the organic medium is preferred. The organic solvent can be appropriately selected from the organic solvents mentioned as examples of the second treatment liquid, and at least one selected from among alkanes, aliphatic esters and aliphatic ketones is preferred.

In the fifth step, the cationic agent is desirably attached so as to further cover the anionic agent that is attached so as to cover the first conductive polymer (and dopant), and is preferably attached in the form of a film to form a layer. When the anionic agent and the cationic agent each are attached in the form of a film, an intermediate layer (first intermediate layer) can be formed.

(Sixth Step)

The sixth step can be performed in the same manner as in the third step or by a procedure similar to that of the third step except that the anode body having brought into contact with the third treatment liquid is used, and a fourth treatment liquid containing the second conductive polymer (a dopant as required) or a raw material of the second conductive polymer is used in place of the first treatment liquid. The fourth treatment liquid can be appropriately selected and used from the materials described in the first treatment liquid except for containing the second conductive polymer or the raw material of the second conductive polymer in place of the first conductive polymer or the raw material of the first conductive polymer.

A mass of the second conductive polymer provided for the anode body preferably ranges from two times to one hundred times, both inclusive, more preferably from five times to fifty times, both inclusive, greater than a mass of the first conductive polymer provided for the anode body. The fourth treatment liquid containing the second conductive polymer can be applied in a state in which the cationic agent is present at a surface, and therefore it is possible for such a large mass of the second conductive polymer to be attached to the cationic agent, and it is possible to increase a thickness of the second conductive polymer layer.

After impregnating the anode body with the fourth treatment liquid, the anode body may be dried as required. During drying, the anode body may be heated as required. Drying may be conducted at atmospheric pressure or may be conducted under a reduced pressure. Impregnation with the fourth treatment liquid and drying may be repeated as a series of steps, as required.

After the sixth step, the anode body having the second conductive polymer layer formed on the anode body is further brought into contact with the anionic agent and/or the cationic agent, as required, and the third conductive polymer layer 6 may be further formed on the resulting anode body. Contact with the anionic agent and/or the cationic agent and formation of the third conductive polymer layer 6 may be repeated to laminate a plurality of the third conductive polymer layers. As the anionic agent and the cationic agent, the agents aforementioned as examples can be each used.

The contact with the anionic agent and the cationic agent may be conducted in the same manner as in the fourth step and the fifth step. More specifically, it is preferred to form the third conductive polymer layer 6 by undergoing a seventh step of bringing a fifth treatment liquid containing an anionic agent into contact with the anode body having the second conductive polymer layer formed on the anode body, an eighth step of bringing a sixth treatment liquid containing a cationic agent into contact with the anode body having brought into contact with the fifth treatment liquid, and a ninth step of forming a third conductive polymer layer 6 by impregnating the anode body having brought into contact with the sixth treatment liquid with a seventh treatment liquid containing a third conductive polymer or a raw material of the third conductive polymer. A thickness of the third conductive polymer layer 6 can be increased by undergoing the seventh step to ninth step.

The seventh step and the eighth step can be performed in the same manner as in the fourth step and the fifth step, respectively. The ninth step can be performed in the same manner as in the sixth step except for using the seventh treatment liquid containing the third conductive polymer or the raw material of the third conductive polymer is used in place of the fourth treatment liquid. After impregnation with the seventh treatment liquid, a drying treatment may be conducted as required. Impregnation with the seventh treatment liquid and drying may be repeated as a series of steps, as required.

In a preferred exemplary embodiment, the seventh step, the eighth step and the ninth step may be repeated plural times as a series of steps. After each step, a drying step may be added as required. By repeating the seventh step to the ninth step, the conductive polymer layers can be laminated, and the effect of suppressing the leakage current and the effect of reducing ESR can be further enhanced.

(Step of Forming Cathode Layer)

The method for manufacturing an electrolytic capacitor can further include a step (tenth step) of forming a cathode layer.

In the tenth step, a cathode layer is formed by sequentially laminating a carbon layer and a silver paste layer on the surface of the anode body (preferably the second conductive polymer layer or the third conductive polymer layer 6) obtained in the sixth step or the ninth step.

The carbon layer can be formed by immersing an anode body having dielectric layer on which the second conductive polymer layer (or the third conductive polymer layer 6) is formed in an aqueous dispersion of carbon (e.g. a conductive carbon material such as graphite), or by applying a carbon paste onto the surface of the second conductive polymer layer (or the third conductive polymer layer 6). The carbon paste is a composition containing a conductive carbon material such as graphite. A thickness of the carbon layer ranges, for example, from 1 µm to 20 µm, both inclusive.

The silver paste is a composition containing silver particles and a resin (binder resin). As the resin, although a thermoplastic resin can be used, a thermosetting resin is preferred to be used. A thickness of the silver paste layer ranges, for example, from 50 µm to 100 µm, both inclusive.

The configuration of the cathode layer is not limited to this example, and it is sufficient that the cathode layer has a function of power collection.

EXAMPLES

The present disclosure is specifically described below with reference to examples and comparative examples. The present disclosure, however, is not limited to the examples below.

Example 1

Electrolytic capacitor 1 shown in FIG. 1 was prepared in the manner described below, and the characteristics of the electrolytic capacitor were evaluated.

(1) Step of Preparing Anode Body 2 (First Step)

Both surfaces of an aluminum foil (thickness: 100 µm) as a substrate were roughened by etching to prepare anode body 2.

(2) Step of Forming Dielectric Layer 3 (Second Step)

A part on one end side of anode body 2 (a part from a separation part to the one end) was immersed in an anodizing solution, and a 70 V DC voltage was applied for 20 minutes to form dielectric layer 3 including aluminum oxide.

(3) Step of Forming First Conductive Polymer Layer (Third Step)

A 3,4-ethylenedioxythiophene monomer was added under agitation to an aqueous poly(styrenesulfonic acid) (weight average molecular weight: 75,000) solution, and then oxidants (iron(III) sulfate and sodium persulfate) were added to the solution to carry out chemical oxidative polymerization. The obtained polymerization solution was subjected to filtration by ion-exchange equipment to remove impurities. Thus, a solution was obtained, which contained poly(3,4-ethylenedioxythiophene) (PEDOT) as the first conductive polymer and poly(styrenesulfonic acid) (PSS) as a dopant.

Pure water was added to the obtained solution, and the resulting mixture was homogenized by a high-pressure homogenizer and was further subjected to filtration by a filter to prepare a first treatment liquid in a state of a dispersion liquid.

Anode body 2, on which dielectric layer 3 was formed, obtained in the above (2), was immersed in the first treatment liquid, was taken out of the first treatment liquid, and further dried at 120° C. for a period ranging from 10 minutes to 30 minutes. Immersion in the first treatment liquid and drying were repeated again, respectively, to form first conductive polymer layer 4a so as to cover the surface of dielectric layer 3. The average thickness of the first conductive polymer layer 4a measured by a scanning electron microscope (SEM) was about 1 µm.

(4) Step of Bringing Anode Body into Contact with Second Treatment Liquid (Fourth Step)

Sulphophthalic acid (anionic agent) was dissolved in pure water to prepare a second treatment liquid. A concentration of the anionic agent in the second treatment liquid was set to 0.025 mol/L.

Anode body 2 obtained in the above (3) was immersed in the second treatment liquid, was taken out of the second treatment liquid, and further dried at 100° C. for 3 minutes.

(5) Step of Bringing Anode Body into Contact with Third Treatment Liquid (Fifth Step)

N,N-dimethyloctylamine (cationic agent) was dissolved in n-hexane to prepare a third treatment liquid. A concentration of the anionic agent in the third treatment liquid was set to 0.05 mol/L. Anode body 2 obtained in the above (4) was immersed in the third treatment liquid, was taken out of the third treatment liquid, and further dried at 100° C. for 3 minutes to form first intermediate layer 4c.

(6) Step of Forming Second Conductive Polymer Layer (Sixth Step)

A fourth treatment liquid was used which was similar in composition to the first treatment liquid used in the above (3). Anode body 2 treated in the above (5) was immersed in the fourth treatment liquid, was taken out of the fourth treatment liquid, and further dried at 120° C. for a period ranging from 10 minutes to 30 minutes. Immersion in the fourth treatment liquid (sixth step) and drying were further alternately repeated twice to form second conductive polymer layer 4b so as to cover a surface of first intermediate layer 4c. The average thickness of second conductive polymer layer 4b was measured in the same manner as in first conductive polymer layer 4a, and the average thickness was about 30 μm.

Thus, first conductive polymer layer 4a, first intermediate layer 4c, and second conductive polymer layer 4b were formed so as to cover the surface of dielectric layer 3.

(7) Step of Forming Cathode Layer 5 (Tenth Step)

Anode body 2 obtained in the above (5) was immersed in a dispersion liquid in which graphite particles were dispersed in water, was taken out of the dispersion liquid, and was dried to form carbon layer 5a on at least a surface of second conductive polymer layer 4b. Drying was carried out at a temperature ranging from 130° C. to 180° C. for a period ranging from 10 minutes to 30 minutes.

Then, a silver paste containing silver particles and a binder resin (epoxy resin) was applied onto a surface of carbon layer 5a, and the layer coated with the silver paste was heated at a temperature ranging from 150° C. to 200° C. for a period ranging from 10 minutes to 60 minutes to cure the binder resin, so that silver paste layer 5b was formed. Thus, cathode layer 5 was formed which included carbon layer 5a and silver paste layer 5b.

As described above, capacitor element 11 was prepared.

(8) Assembling of Electrolytic Capacitor

Cathode layer 5 of capacitor element 11, obtained in the above (7), was joined with one end (first end) 14a of cathode terminal 14 by conductive adhesive 17. The other end of anode body 2, which protruded from capacitor element 11, was joined with one end (first end) 13a of anode terminal 13 by laser welding.

Then, resin outer packing 12 formed of an insulating resin was formed around capacitor element 11 by a transfer molding method. Then, other end (second end) 13b of anode terminal 13 and other end (second end) 14b of cathode terminal 14 were in a state of being drawn out from resin outer packing 12.

Thus, electrolytic capacitor 1 (A1) was completed. In the same manner as described above, a total of 250 electrolytic capacitors 1 were prepared.

(9) Evaluation

The following evaluations were performed using an electrolytic capacitor.

(a) ESR

From the electrolytic capacitors, 120 electrolytic capacitors were randomly selected, and an ESR value (mΩ) was measured at a frequency of 100 kHz for each of the electrolytic capacitors by an LCR meter for 4-terminal measurement, and an average value was obtained.

(b) Fraction of LC Defective

A resistance of 1 kΩ was connected to the electrolytic capacitor in series, and a leakage current (μA) after applying a rated voltage of 25 V for 1 minute by a DC power source was measured. Measurement was carried out for each of 250 electrolytic capacitors. Then, an electrolytic capacitor having a leakage current amount exceeding 20 μA was determined to be defective, and the fraction of LC defective (%) was calculated. The term "fraction of LC defective" is an index indicating a degree of leakage current (LC) of a solid electrolytic capacitor.

Example 2

Naphthalenesulfonic acid (anionic agent) was dissolved in pure water in a concentration of 0.06 mol/L to prepare a second treatment liquid. Electrolytic capacitor (A2) was produced in the same manner as in Example 1 except for using the obtained second treatment liquid in the fourth step, and the electrolytic capacitor was evaluated.

Example 3

Electrolytic capacitor (A3) was produced in the same manner as in Example 1 except for preparing a third treatment liquid with use of, as a cationic agent, octylamine in place of N,N-dimethyloctylamine in the fifth step, and the electrolytic capacitor was evaluated.

Example 4

Electrolytic capacitor (A4) was produced in the same manner as in Example 1 except for preparing a third treatment liquid with use of, as a cationic agent, 1,8-diaminooctane in place of N,N-dimethyloctylamine in the fifth step, and the electrolytic capacitor was evaluated.

Example 5

Electrolytic capacitor (A5) was produced in the same manner as in Example 1 except for changing the concentration of sulphophthalic acid to 0.06 mol/L to prepare a second treatment liquid, and the electrolytic capacitor was evaluated.

Example 6

Electrolytic capacitor (A6) was produced in the same manner as in Example 1 except for preparing a second treatment liquid with use of p-toluenesulfonic acid in place of naphthalenesulfonic acid, and the electrolytic capacitor was evaluated.

Example 7

Electrolytic capacitor (A7) was produced in the same manner as in Example 1 except for preparing a third treatment liquid with use of, as a cationic agent, decylamine in place of N,N-dimethyloctylamine in the fifth step, and the electrolytic capacitor was evaluated.

Example 8

Electrolytic capacitor (A8) was produced in the same manner as in Example 1 except for preparing a second treatment liquid with use of poly(styrenesulfonic acid) in place of naphthalenesulfonic acid, and the electrolytic capacitor was evaluated.

Example 9

Electrolytic capacitor (A9) was produced in the same manner as in Example 1 except for preparing a second treatment liquid with use of a styrenesulfonic acid-acid phosphoxyethyl methacrylate copolymer in place of naphthalenesulfonic acid, and the electrolytic capacitor was evaluated.

Comparative Example 1

Instead of conducting the fourth step and the fifth step, anode body 2 obtained in the third step was immersed in a treatment liquid produced by dissolving p-toluenesulfonic acid (anionic agent) and N,N-dimethyloctylamine (cationic agent) in pure water, and was taken out and dried at 100° C. for 3 minutes. Electrolytic capacitor (B1) was produced in the same manner as in Example 6 except for the above-described operations, and the electrolytic capacitor was evaluated. A concentration of the anionic agent in the treatment liquid was set to 0.06 mol/L and a concentration of the cationic agent was set to 0.05 mol/L.

Comparative Example 2

Electrolytic capacitor (B2) was produced in the same manner as in Example 1 except for conducting the sixth step with use of anode body 2 obtained in the third step without conducting the fourth step and the fifth step, and the electrolytic capacitor was evaluated.

Comparative Example 3

Instead of conducting the fourth step and the fifth step, anode body 2 obtained in the third step was immersed in a treatment liquid produced by dissolving sulphophthalic acid (anionic agent) and N,N-dimethyloctylamine (cationic agent) in pure water, and was taken out and dried at 100° C. for 3 minutes. Electrolytic capacitor (B3) was produced in the same manner as in Example 1 except for the above-described operations, and the electrolytic capacitor was evaluated. A concentration of the anionic agent in the treatment liquid was set to 0.025 mol/L and a concentration of the cationic agent was set to 0.05 mol/L.

TABLE 1

| No | ESR (mΩ) | Fraction of LC Defective (%) |
|---|---|---|
| A1 | 34.2 | 0.21 |
| A2 | 37.5 | 0.26 |
| A3 | 30.3 | 0.22 |
| A4 | 29.4 | 0.19 |
| A5 | 34.0 | 0.29 |
| A6 | 37.9 | 0.21 |
| A7 | 31.1 | 0.22 |
| A8 | 38.9 | 1.21 |
| A9 | 39.1 | 0.30 |
| B1 | 85.5 | 24.30 |
| B2 | 110.5 | 100.00 |
| B3 | 69.1 | 19.90 |

In Examples, the ESR values and the LC defective rates were markedly reduced, as compared to Comparative Examples, as shown in Table 1.

The electrolytic capacitor according to the exemplary embodiment of the present disclosure can be used for various uses in which the reduction of ESR and the suppression of leakage current are required.

What is claimed is:

1. An electrolytic capacitor comprising:
an anode body;
a dielectric layer formed on the anode body;
a first conductive polymer layer covering at least a part of the dielectric layer;
a second conductive polymer layer covering at least a part of the first conductive polymer layer; and
a first intermediate layer formed between the first conductive polymer layer and the second conductive polymer layer,
wherein:
the first conductive polymer layer includes a first conductive polymer and a dopant,
the first intermediate layer includes a cationic agent, and an anionic agent which is different from the dopant,
the first intermediate layer has a first region and a second region, the first region being in direct contact with or infiltrating the first conductive polymer layer, the second region facing the second conductive polymer layer,
the first region contains a greater amount of the anionic agent than the second region, and
the second region contains a greater amount of the cationic agent than the first region.

2. The electrolytic capacitor according to claim 1, wherein:
the cationic agent includes a cationic group,
the cationic group includes an amino group,
the anionic agent includes an anionic group, and
the anionic group includes at least one selected from the group consisting of a sulfonate group, a phosphate group, a phosphonate group, and a carboxyl group.

3. The electrolytic capacitor according to claim 1, wherein a thickness of the second conductive polymer layer ranges from 5 μm to 50 μm, both inclusive.

4. The electrolytic capacitor according to claim 1, further comprising:
a third conductive polymer layer covering at least a part of the second conductive polymer layer; and
a second intermediate layer formed between the second conductive polymer layer and the third conductive polymer layer,
wherein a thickness of the third conductive polymer layer ranges from 5 μm to 50 μm, both inclusive.

5. The electrolytic capacitor according to claim 1, wherein the dopant is a polymer compound having an acid group.

6. The electrolytic capacitor according to claim 1, wherein the anionic agent includes a monomer compound.

7. The electrolytic capacitor according to claim 1, wherein at least a part of the first intermediate layer may infiltrate the first conductive polymer layer.

8. The electrolytic capacitor according to claim 1, wherein:
the cationic agent includes a cationic group,
the cationic group includes an amino group,
the anionic agent includes an anionic group, and
the anionic group includes at least one selected from the group consisting of a sulfonate group, a phosphate group, a phosphonate group, and a carboxyl group.

9. An electrolytic capacitor comprising:
an anode body;
a dielectric layer formed on the anode body;
a first conductive polymer layer covering at least a part of the dielectric layer;
a second conductive polymer layer covering at least a part of the first conductive polymer layer; and
a first intermediate layer formed between the first conductive polymer layer and the second conductive polymer layer, wherein:
the first conductive polymer layer includes a first conductive polymer and a dopant,
the first intermediate layer includes a cationic agent, and an anionic agent which includes a monomer compound,
the first intermediate layer has a first region and a second region, the first region being in direct contact with or infiltrating the first conductive polymer layer, the second region facing the second conductive polymer layer,
the first region contains a greater amount of the anionic agent than the second region, and
the second region contains a greater amount of the cationic agent than the first region.

10. The electrolytic capacitor according to claim 9, wherein a thickness of the second conductive polymer layer ranges from 5 μm to 50 μm, both inclusive.

11. The electrolytic capacitor according to claim 9, further comprising:
a third conductive polymer layer covering at least a part of the second conductive polymer layer; and
a second intermediate layer formed between the second conductive polymer layer and the third conductive polymer layer,
wherein a thickness of the third conductive polymer layer ranges from 5 μm to 50 μm, both inclusive.

* * * * *